July 12, 1960 V. L. STREETER 2,944,420
FLOW METER
Filed Oct. 25, 1956
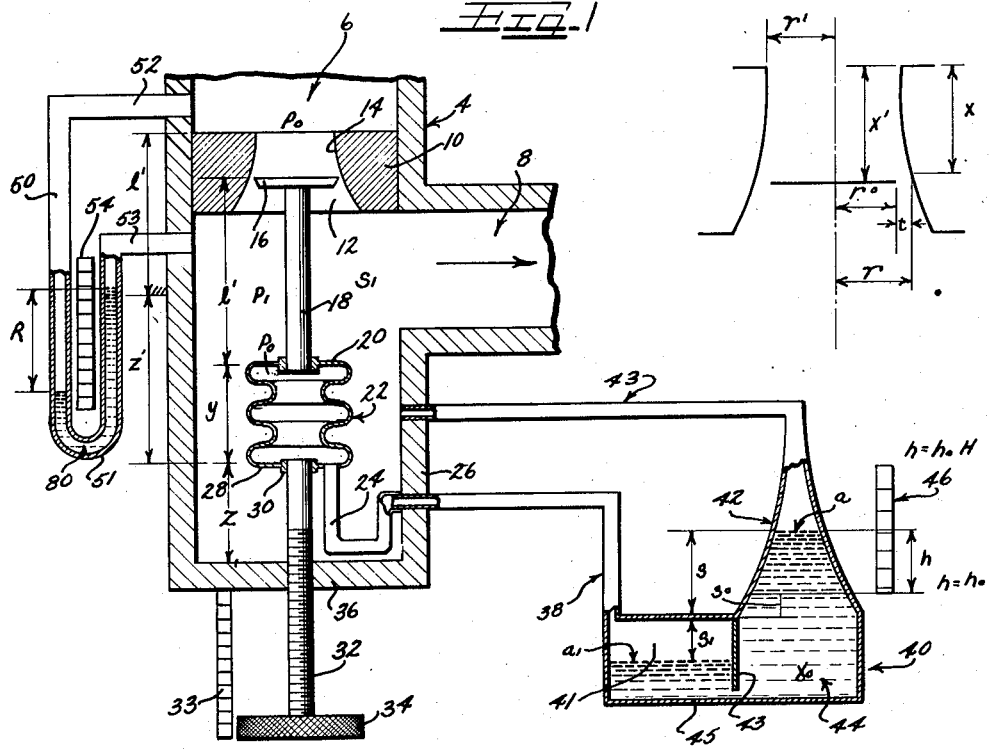
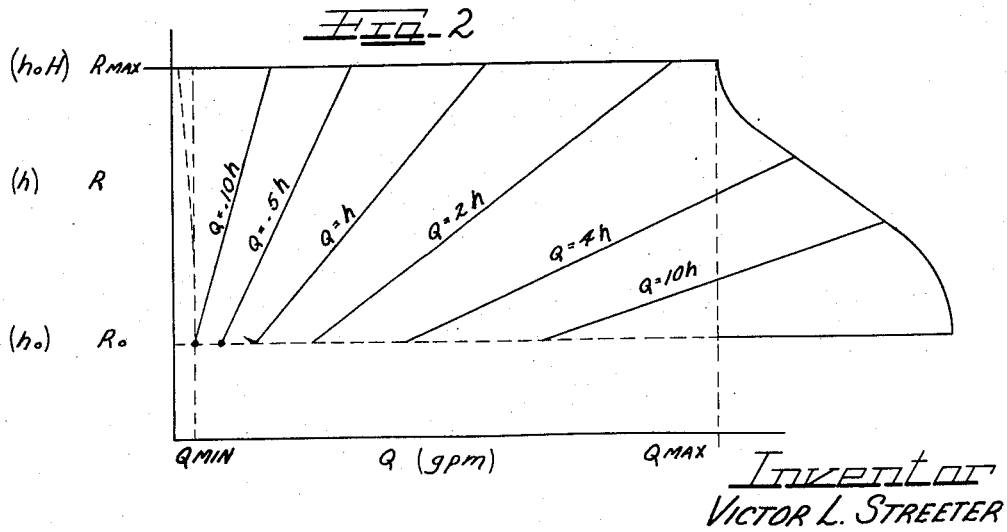
Inventor
VICTOR L. STREETER

# United States Patent Office 2,944,420
Patented July 12, 1960

2,944,420
FLOW METER

Victor L. Streeter, Ann Arbor, Mich., assignor to The Dole Valve Company, Chicago, Ill., a corporation of Illinois Filed Oct. 25, 1956, Ser. No. 618,252

6 Claims. (Cl. 73—209)

The present invention relates to an improved flow meter which has a discharge linearly related to the pressure head and which is adjustable in range and sensitivity.

In the measurement of flow of fluids, an accurate reliable and uncomplicated meter is useful in many circumstances. To avail additional advantages the meter should be adjustable for discharge over a substantial range. In my co-pending application, "Adjustable Flow Control," Serial No. 446,867, filed July 30, 1954, there is disclosed a flow control valve arrangement wherein a valve body is provided which contains an orifice having a shaped surface of revolution and a thin-edged poppet disk movable in the orifice to vary the cross-sectional opening with movement. The profile of the surface of revolution of the orifice is shaped so that with non-linear backing for the disc the discharge of the valve may be held constant with variations in pressure drop across the valve. The profile of the valve is such that when the discharge coefficient is constant the flow area will vary inversely as the square root of the head. The poppet disk is supported by a non-linear spring support.

In the present invention I employ a movable poppet disc within a valve orifice wherein the orifice has a profile following the laws disclosed in the aforementioned patent application. The profile of the orifice is so designed that its area of flow around the poppet disc increases in the downstream direction and as the poppet disc moves downstream with head increase the flow area will increase. The orifice profile follows the laws disclosed in the aforementioned application and the poppet is supported by an improved non-linear support, following the same laws disclosed in the aforementioned application. The non-linear support is provided by an expansible chamber such as a bellows connected to a manometer containing a fluid which acts both as a resisting medium and as a flow indicating medium. The apparatus so combined serves as a flow meter and is capable of indicating flow with a scale which provides a linearly changeable reading of the flow through the valve. If desired an additional manometer connected to each side of the orifice may be used to obtain a gage difference linearly proportional to the flow.

Accordingly, it is an object of the invention to provide an improved flow meter suitable for use in a stream of fluid wherein the flow is indicated with means reading proportional to flow.

Another object of the invention is to provide a flow meter having an adjustable range and sensitivity.

A further object of the invention is to provide a flow meter having an orifice with a profiled throat and a movable poppet positioned in said throat wherein the area will vary as the square root of the pressure head and wherein the poppet is provided with a liquid backing which provides a non-linear support for the position of the poppet.

A yet further object of the invention is to provide a flow meter having an orifice with a profiled throat and a disc poppet movable relative thereto, with the relative position of the poppet controlled by a bellows and with a manometer supplying liquid pressure to the bellows to provide a non-linear support for the poppet and whereby the flow through the orifice throat is registered as a linear displacement of the fluid in the manometer.

Another object of the invention is to provide a metering valve including an orifice and poppet wherein one of the members has a profile following the relationship of $$C_d A = (C_d A)_{\min} e^{\frac{x' \ln H}{2Y_0}}$$

and wherein the position of the poppet is controlled by a non-linear liquid backing and the fluid is placed in a chamber wherein differences in levels of menisci are linearly varied with variations in flow.

Yet another object of the present invention is to provide an improved metering valve poppet positioned within an orifice with one of said members having an area defining profile following the relationship of $$x = \frac{2Y_0}{\ln H}\left\{\ln\left[2\sqrt{2}\frac{r_0 + \frac{t}{2}}{r'^2 - r_0^2}\frac{Y_0}{\ln H}\sqrt{1 - \sqrt{1 - \left(\frac{t \ln H}{Y_0}\right)^2}}\right] - \frac{1}{2}\left[1 - \sqrt{1 - \left(\frac{t \ln H}{Y_0}\right)^2}\right]\right\}$$

wherein the movable valve member is regulated in position by non-linear liquid backing wherein the differences in levels of menisci of the liquid in a liquid container will be linearly proportional to the flow through the valve.

A still further object of the invention is to provide a metering valve having an orifice member and a poppet member therein with one of said members having a surface of revolution to vary the cross-sectional area with relative movement of one of the members in the direction of flow and wherein the movable member is controlled in position by a non-linear liquid backing contained in a manometer tube wherein the head displacement relation of the movable member obeys the law $$h = h_0 H e^{\frac{-y \ln H}{Y_0}}$$

A still further object of the invention is to provide a new and improved flow metering device for registering the flow of a fluid including a valve poppet movable within an orifice having a throat profile that increases in a downstream direction and wherein the position of the poppet is controlled by a non-linear fluid backing with the fluid contained in a manometer tube having a shape following the law $$a = \frac{a_1}{\frac{a_1 \ln H}{A_b Y_0}s_0 e^{\frac{s_1 a_1 \ln H}{A_b Y_0}} - 1}$$

$$s = s_0 e^{\frac{s_1 a_1 \ln H}{A_b Y_0}} - s_1$$

Other objects, features and advantages of the present invention will become more apparent in the following disclosure of the invention in the detailed description of the preferred embodiment thereof in the specification, claims and appended drawings, in which:

Figure 1 is a general diagrammatic illustration of an adjustable fluid meter of the type employing the principles of the invention;

Figure 2 is a graphic presentation plotting the fluid flow through the meter against the reading of the manometer for various sensitivity settings of the meter; and Figure 3 shows the symbols used relative to the orifice.

As illustrated in the drawings, the flow meter embodies an orifice having a surface of revolution increasing in cross-sectional area in a downstream direction with a movable poppet disc positioned in the valve and controlled in position by a bellows containing the same liquid as that flowing, in contact with liquid from a shaped manometer tube. The liquid supplies a non-linear support for the poppet and pressure drop across the poppet reacts on the liquid to cause a linear displacement of the differences in elevation of menisci of the liquid with fluid flow. The auxiliary manometer across the orifice has a gage difference linearly proportional to discharge. The relationships between the profile of the orifice and the shape of the manometer tube will be disclosed and developed hereinbelow.

In the structure of the flow meter, the fluid flow is directed through a valve housing 4 having an inlet passageway 6 and an outlet passageway 8. Between these two passageways is positioned the orifice defining member 10 providing an orifice 12 as defined by the surface of revolution 14. Movable within the orifice is a valve poppet head or disc 16 mounted on a supporting stem 18. The relationship between the orifice 14 and the poppet disk 16 is such that movement of the poppet relative to the orifice member 10 will obtain a cross-sectional area for flow of fluid through the housing varying with the head and flow of fluid. It is to be noted that for certain purposes this preferred form may be altered such as by mounting the orifice defining member to be the movable member and the poppet disc fixed. Also, the orifice defining member may be provided with a knife edge and the poppet may be shaped with an outer profiled face. The same defining equations for areas may also apply to cross sections other than those defined by a surface of revolution.

The stem 18 of the valve poppet is connected to the movable end 20 of a bellows 22 which has a very small resistance to expansion or compression. The bellows is capable of expansion for a length $Y_0$. The bellows, which is the preferred form of expansible chamber used, and is connected to the flexible tube 24 which leads through the wall 26 of the valve housing 4. The flexible tube permits the base 28 of the bellows to be adjusted in position. The base 28 is rotatably mounted by means of a fitting 30 to permit rotation of the support screw 32. This screw is threadably mounted in the lower wall 36 of the valve housing and the screw carries a manually rotatable knob 34 for vertically displacing the screw 32 up and down to adjust the position of the bellows 22.

The fluid conducting flexible line 24 which leads through the wall 26 of the valve housing, connects to a conduit 38 which in turn connects to the base of a manometer 40. The manometer has a vertically extending contoured tube 42 which is shaped so that the manometer liquid 44 within the tube 42 will give a non-linear support to the poppet disk 16, and will rise and fall linearly with variations in fluid flow through the orifice throat 12. The upper end of the manometer tube 42 is connected by a line 43 to the downstream side of the control valve housing 4.

The manometer liquid is contained in the well 45 of the manometer and a dividing wall 43 separates the open chamber 41 from the manometer tube 42. The liquid in the chamber 41 is exposed to the fluid in the lines 24 and 38 leading to the interior of the bellows. This fluid may be the same as that flowing through the control valve.

The manometer is provided with a scale 46 having non-uniform graduations thereon which may be referred to as in units of $h$. The scale begins at $h_0$ where $h=h_0$, which is the minimum design pressure head drop across the disc 16 and extends up to $h_0H$, the maximum design pressure head drop. $s_0$ is shown at the lower limits of the range of the apparatus wherein $h$ is also shown equal to $h_0$ which is the lower limit of the range. When $s=s_0$, $s_1=0$.

If desired an auxiliary manometer 50 may be provided, as illustrated in Figure 1. This has a U-shaped tube 51, containing a liquid. The tube 51 has an upper end 52 communicating with the valve on the upstream side of the orifice 14 and a lower end 53, communicating with the downstream side. A linearly graduated scale 54 indicates the difference in height of liquid in the legs of the U-tube 51, which varies linearly with the rate of flow through the orifice.

The throat 12 of the orifice, formed by the surface of revolution 14 of the orifice member 10, is designed to follow the law $$C_d A = (C_d A)_{min} e^{\frac{x' \ln H}{2Y_0}} \qquad (1)$$

The contour of surface of revolution is designed in accordance with the relation of $$x = \frac{2Y_0}{\ln H} \ln \left\{ \left[ 2\sqrt{2} \frac{r_0 + \frac{t}{2}}{r'^2 - r_0^2} \frac{Y_0}{\ln H} \sqrt{1 - \sqrt{1 - \left(\frac{t \ln H}{Y_0}\right)^2}} \right] - \frac{1}{2}\left[1 - \sqrt{1 - \left(\frac{t \ln H}{Y_0}\right)^2}\right] \right\} \qquad (2)$$

which is equivalent to Eq. 1 when the discharge coefficient $C_d$ is constant. Although the orifice may be provided with guides or vanes to maintain the poppet disc centrally located therein, such guides or vanes may not be necessary in certain environments and they are omitted from the foregoing formula.

The manometer support supplying the backing fluid supports the disk non-linearly through the bellows so that the head displacement relation of the disk obeys the law $$h = h_0 H e^{\frac{-y \ln H}{Y_0}} \qquad (3)$$

$z'$ is a measure of the position of the base 28 of the bellows, adjustable by turning knob 34. Solving Equation 3 for $y$, and using the relation $$x' = z' - y = z' - \frac{Y_0}{\ln H} \ln \frac{h_0 H}{h} \qquad (4)$$

and the discharge equation $$Q = C_d A \sqrt{2gh} \qquad (5)$$

with equation 1

$$Q = (C_d A)_{min} e^{\frac{z' \ln H}{2Y_0}} \sqrt{\frac{2g}{h_0 H} h} \qquad (6)$$

This equation shows that for any setting $z'$ of the control knob, the discharge bears linearly with the head drop across the disc. Hence, the proportionality factor in $$Q = \alpha h \qquad (7)$$

can be varied by changing $z'$.

The manometer difference $s + s_1$, is linearly related to head drop across the disc by $$F = C_D \pi r_0^2 \alpha h = A_b (\gamma_0 - \gamma)(s + s_1) \qquad (8)$$

For minimum design head $h_0$ the force $F_0$ on the disc is $$F_0 = C_D \pi r_0^2 \gamma h_0 = A_b (\gamma_0 - \gamma) s_0 \qquad (9)$$

since $s_1 = 0$ for $s = s_0$ and $h = h_0$.

To find the cross-sectional area $a$ of the manometer as a function of $s$, a parametric solution in terms of $s_1$ is obtained, as follows:

By displacing the bellows a distance $-dy$, $$-dy A_b = a_1 ds_1 = a ds \qquad (10)$$

Since F and $F_0$ are proportional to $h$ and $h_0$ respectively, Equation 3 becomes $$y = \frac{Y_0}{\ln H} \ln \frac{F_0 H}{F} \quad (11)$$

Using the last four equations to eliminate $F$, $F_0$, and $y$, $a$ and $s$ are found in terms of $s_1$, $$a = \frac{a_1}{\frac{s_0 a_1 \ln H}{A_b Y_0} e^{\frac{s_1 a_1 \ln H}{A_b Y_0}} - 1} \quad (12)$$

and $$s = s_0 e^{\frac{s_1 a_1 \ln H}{A_b Y_0}} - s_1 \quad (13)$$

Values of $s_1$, starting with zero, are substituted into Equations 12 and 13 and the corresponding pairs of values of $s$ and $a$ obtained.

From Equation 13, for a given flow meter, it is shown that for any $s_1$ one $s$ results and, hence, from Equation 8 there is one $h$ for each $s_1$ independent of $z'$. This non-linear scale is laid off on scale 46 and labeled in terms of $h$, from $h_0$ to $h_0 H$. The flow is $Q = \alpha h$ where $\alpha$ depends on $z'$. By laying off the scale 33 to read $\alpha$ for each setting $z'$, the reading on scale 46 is then multiplied by the $\alpha$ indicated by the position of knob 34 to yield the flow. The chart shows some of the possible settings $\alpha$ with the resulting linear head-discharge relations and the ranges of discharge and sensitivity.

For vertical installations the weight of moving parts may be taken into account by changing the amount of manometer fluid and correspondingly the base of scale 46.

For the auxiliary manometer 50

$$h = R\left(\frac{\gamma_0}{\gamma} - 1\right)$$

and R may be read directly in terms of head $h$ as scale 46, the only difference being that the scale on manometer 50 is uniform.

In the mathematical disclosure above, the symbols may be generally defined as follows:

$a$ = cross sectional area of manometer at height $s$
$a_1$ = manometer cross-sectional area (lower leg)
$A$ = net area of opening between disc and throat
$A_b$ = bellows area
$C_d$ = discharge coefficient
$C_D$ = drag coefficient
$e$ = base of natural logarithms
$F$ = pressure force on disc
$F_0$ = minimum design force on disc
$H$ = ratio of maximum design fluid head to minimum design fluid head
$h$ = head drop across disc
$h_0$ = minimum design head loss across disc
$l'$ = length of stem of valve disc
$\ln$ = natural logarithm
$Q$ = discharge
$r$ = radial coordinate of throat = $r_0 + t$
$r'$ = minimum throat radius
$r_0$ = disc radius
$R$ = gage difference on auxiliary manometer
$s$, $s_0$, $s_1$ = dimensions in manometer
$t = r - r_0$
$\gamma$ = unit weight of fluid flowing
$\gamma_0$ = unit weight of manometer liquid
$x$ = axial coordinate of throat profile
$x'$ = position of disc in throat
$Y$ = bellows opening (disc movement from position of maximum head)
$Y_0$ = bellows opening (disc movement) when $h = h_0$
$z'$ = discharge range setting
$\alpha$ = proportionality factor $Q/h$ Thus, it will be seen that I have provided an improved flow meter which is susceptible of accurately indicating quantities of flow as a straight line linear function of the manometer difference. The apparatus is of non-complicated construction and is accurate and reliable. By providing an orifice with a poppet disc and designing the two members to be movable relative to each other, and having one of the members with a surface contour so that the flow area increases in a downstream direction in accordance with the laws herein presented, and providing a non-linear liquid backing from a manometer having a cross-sectional area developed in accordance with the rules herein set forth, a flow meter will be attained having a reading linearly proportional to the flow and also being provided with adjustable sensitivity.

I have, in the drawings and specification, presented a detailed disclosure of the preferred embodiments of my invention, but it is to be understood that I do not intend to limit the invention to the specific form disclosed but intend to cover all modifications, changes and alternative constructions and methods falling within the scope of the principles taught by my invention.

I claim as my invention:

1. A flow meter for measuring the flow of a fluid with varying head comprising a meter housing having an inlet and an outlet, an orifice member between said inlet and outlet and provided with an orifice opening with an increasing cross-section in a downstream direction, a valve disc positioned in said orifice movable with variations in pressure head to vary the cross-sectional flow area through said orifice, a bellows having a small resistance to compression and expansion and having a movable end operatively connected to said disk, a liquid manometer in communication with said bellows and having a shape so that liquid in the manometer will apply a non-linear force to the bellows to supply a non-linear support for the disc, and indicating means indicating pressure drop across said disc to indicate the rate of flow through said orifice.

2. A flow meter for measuring the flow of fluid with varying head comprising a housing for the meter having an inlet passageway and a discharge passageway, an orifice member defining an orifice for the flow of fluid between said passageways, a movable disk positioned in the orifice, the orifice having a profiled throat which increases in cross-sectional area in a downstream direction, an expansible chamber having a movable element connected to the disc to control its position, a fluid containing manometer in communication with said expansible chamber and having a shape of varying cross section wherein the fluid applies a non-linear force to said chamber and controls the position of the disc in accordance with the law $$h = h_0 H e^{\frac{-y \ln H}{Y_0}}$$

in which:

$h$ is the head drop across the disc
$h_0$ is the minimum design head loss across the disc
$H$ is the ratio of maximum design fluid head to minimum design fluid head
$e$ is the base of natural logarithms
$y$ is the disc movement
$\ln$ is the natural logarithm
$Y_0$ is the disc movement when $h$ equals $h_0$ and indicating means for indicating pressure drop across the disc to indicate the rate of flow of fluid through the orifice.

3. A fluid meter for measuring the flow of fluid with varying head comprising a valve housing having a flow passageway therethrough leading between an inlet opening and a discharge opening, an orifice member in said passageway defining a flow orifice therethrough with increasing cross-sectional area in a downstream direction, a control disc positioned in said orifice and movable relative thereto to vary the flow area therebetween with variations in flow head, an expansible chamber having a movable element connected to the valve disc to control its position, a manometer tube of varying cross section for containing a liquid and having one end of uniform cross section in communication with said expansible chamber to transmit a non-linear liquid force to said movable element, and having the other end of non-uniform cross section being in communication with the fluid pressure downstream of said orifice member, the manometer tube developed in accordance with the laws $$a = \frac{a_1}{\frac{a_1 s_0 \ln H}{A_b Y_0} e^{\frac{s_1 a_1 \ln H}{A_b Y_0}} - 1}$$

$$s = s_0 e^{\frac{s_1 a_1 \ln H}{A_b Y_0}} - s_1$$

in which:

$a$ is the cross-sectional area of the non-uniform end of the manometer at a height $s$
$a_1$ is the manometer cross-sectional area of the uniform end
$A_b$ is the area of the movable element of the expansible chamber
ln is the natural logarithm
$H$ is the ratio of maximum design fluid head to minimum design fluid head
$Y_0$ is the disc movement when $h$ equals $h_0$ where $h$ is the head drop across the disc and $h_0$ is the minimum design head loss across the disc
$s$ is the manometer height of the end of non-uniform cross section
$s_0$ is the height of liquid in the manometer end of non-uniform cross section for minimum design fluid head
$e$ is the base of natural logarithms
$s_1$ is the depression of the liquid in the manometer end of uniform cross section whereby the fluid in the manometer tube forms a non-linear backing for the valve disc, and indicating means for indicating pressure drop across said control disc to indicate the rate of flow.

4. A flow meter for measuring the flow of fluid with varying head comprising a meter body forming a conduit for the flow of fluid, an orifice member in said housing providing a shaped orifice therein having an increasing cross-section in a downstream direction, a poppet valve member movable within said orifice to vary the cross-sectional flow area with changes in head, an expansible bellows having a very small resistance to compression or expansion with a movable end connected to control the position of said poppet, a liquid manometer in communication with the bellows having a configuration to give a non-linear support to the poppet and wherein the fluid will vary in height in the manometer with variations in flow through the orifice as the pressure differential across the poppet valve member fluctuates and means to adjustably support the position of the bellows.

5. A flow meter for measuring the flow of fluid with varying head comprising a meter housing having an inlet and an outlet, an orifice member defining an orifice between the inlet and outlet for the flow of fluid through the housing, a movable poppet within said orifice, said orifice contoured to have an increasing cross-sectional area in a downstream direction, an expansible chamber having a movable element connected to the poppet to influence the position thereof, a liquid manometer, a conduit forming a communication line between the expansible chamber and the manometer whereby fluid in the manometer exerts a non-linear reactance pressure on the poppet, and a scale positioned adjacent the manometer providing an indication of the position of the poppet in accordance with the position of the fluid in the manometer.

6. A flow meter for measuring the flow of fluid with varying head comprising a meter housing having an inlet and an outlet opening, an orifice defined in a member between said openings, a movable poppet member positioned in said orifice, said orifice contoured to have an increasing area in a downstream direction, an expansible fluid chamber having a movable element influenced by the pressure of the fluid therein and operably connected to said poppet, a liquid manometer in communication with the expansible chamber whereby the fluid in the manometer exerts a non-linear reactance pressure on the poppet and wherein the height of the fluid indicates the position of the poppet within the orifice, an adjustment member supporting the expansible chamber, and a scale positioned adjacent the manometer and having indicia therein coordinated with the adjustment member so that the readings on the scale will be linearly proportional to the flow through the meter and the position of the expansible chamber can be adjusted so that the readings of the scale will vary in accordance with a selected multiple of the flow through the meter.

References Cited in the file of this patent

UNITED STATES PATENTS

| | | |
|---|---|---|
| 1,986,986 | Swartwout | Jan. 8, 1935 |
| 2,072,220 | Sandison | Mar. 2, 1937 |
| 2,367,176 | Ahlstrom et al. | Jan. 16, 1945 |

FOREIGN PATENTS

| | | |
|---|---|---|
| 378,726 | Germany | July 30, 1923 |
| 389,969 | Germany | Feb. 11, 1924 |